United States Patent
Harris et al.

[15] 3,666,698
[45] May 30, 1972

[54] WATER-SOLUBLE POLYESTER RESIN CONTAINING PHENYLINDAN DICARBOXYLIC ACID

[72] Inventors: Robert R. Harris, Burnham, Ill.; Carl H. Kressman, Long Beach, Calif.

[73] Assignee: The Sherwin-Williams Company, Cleveland, Ohio

[22] Filed: Dec. 14, 1970

[21] Appl. No.: 98,038

[52] U.S. Cl.....................260/22 M, 117/161 K, 260/29.2 E, 260/33.2 R, 260/97.5
[51] Int. Cl.........................................C09d 3/64, C09d 5/14
[58] Field of Search..................................260/22, 97.5, 75 R

[56] References Cited

UNITED STATES PATENTS

| | | | |
|---|---|---|---|
| 2,873,262 | 2/1959 | Petropoulos | 260/22 |
| 3,577,371 | 5/1971 | Blair | 260/22 |
| 3,539,619 | 11/1970 | Steitz | 260/75 |

OTHER PUBLICATIONS

Petropoulos, J. C., " Novel Alkyd Resins," Official Digest, 34, No. 452, pp. 992– 1,000, 1,002 & 1,003 (1962).
Steitz et al., " Phenylindan Dicarboxylic Acid: A New Polcondensation Monomer," Journal of Paint Technology, Vol. 40, No. 524, 9/1968 pg. 384– 388

*Primary Examiner*—Donald E. Czaja
*Assistant Examiner*—Ronald W. Griffin
*Attorney*—Richard G. Smith and Lowell G. Wise

[57] ABSTRACT

Alkyd resins which contain critical amounts of tall oil fatty acid and phenylindane dicarboxylic acid (PIDA) in combination with trimetllitic anhydride and trimethylol propane gives a resin which is dispersible in water, yet has exceptionally high mildew resistance, strength, hydrolytic stability, chemical resistance, film hardness, and excellent properties of fast drying and adhesion. The resin may be deposited in an electrophoresis bath if it is first solubilized by the addition of an alkaline material. The resin is self-curing and dries in air to a hard, durable, glossy film which does not require to be baked.

4 Claims, No Drawings

WATER-SOLUBLE POLYESTER RESIN CONTAINING PHENYLINDAN DICARBOXYLIC ACID

BACKGROUND OF THE INVENTION

Over the past quarter of a century, water thinned vehicles have been developed and marketed for use in air dried coatings. Generally, they have been used for interior flat wall paints, primarily because they exhibited inadequate properties for acceptance in outdoor-protective usage. More recently water-dispersible paints have been used in outdoor-protective usage except that they are still subject to degradation by mildew and they are characterized by inadequate hydrolytic stability, hardness and chemical resistance. Emulsion stability in particular has been a serious problem because the use of emulsifiers, wetting agents, buffers, thickeners, and protective colloids have often been entrapped in the film decreasing its adhesion to surfaces which are less than clean, and increasing its sensitivity to the elements and to the attack by various fungi.

Desirable resins are those which can be used like organic resin solutions, are stable to agitation and which can be pigmented in conventional equipment. Preferably, a relatively high pigment-to-resin ratio is desirable to give the film a high gloss with excellent hiding power.

It is known that trimellitic anhydride (TMA) with propylene glycol and adipic acid can be cooked to give an alkali-ammonia-, or amine-solubilizable resin which can be thinned to about 30 percent non-volatile material and be used in an electrodeposition bath. The drawbacks of the TMA-propylene glycol-adipic acid resin are that, (1) it is extremely expensive, and, (2) it does not dry very well without being baked. The use of trimellitic anhydride in water-soluble baking resins is disclosed in an article in the American Paint Journal, pages 71–84, June 20, 1960, by Benjamin Bolton and R. E. Van Strien.

It is known that PIDA is a versatile polycondensation monomer. Copolyesters with terephthalic acid and ethylene glycol containing up to 30 percent by weight of PIDA can be drawn into fibers having good properties. It is also known that in air drying alkyds, PIDA contributes faster drying rates and harder films than any of the phthalic acids at the same oil length. Baking type alkyds cured with melamine resin have demonstrated excellent heat, mechanical, and chemical resistance. The synthesis structure and property of various polyesters using PIDA have been discussed in an article entitled "Phenylindan Dicarboxylic Acid: A New Polycondensation Monomer" by Stitz and Knobloch Journal of Paint Technology, Vol. 40, No. 524, September, 1968, pp. 384 to 393. Specifically, studies were made of a copolyester of PIDA and terephthalic acid with ethylene glycol in an effort to combine the properties of the separate homopolymers because it would be desirable to have a polymer with the crystallinity of polyethylene terphthalate and the high second order transition temperature and low density of polyethylene phenylindan dicarboxylic. This prior art showed that the optimum combination of properties occurs with up to 30 weight percent of PIDA, after which the density of the polymers decreases. The instant resin which requires more than 30 percent by weight PIDA can be used like an organic resin solution, is stable to agitation and can be pigmented in conventional equipment. It is particularly adapted to accommodate a relatively high pigment resin ratio which is desirable to give the film a high gloss with excellent hiding power.

SUMMARY OF THE INVENTION

It has been discovered that a water-soluble polyester resin, particularly useful in coatings which require tough, strong and durable films with high resistance to chemicals, moisture and mildew can be made from critical amounts of PIDA and tall oil, and appropriate amounts of trimethylol propane and trimellitic anhydride determined by the amounts of PIDA and tall oil used. The critical amount of PIDA is in the range from 31 to 45 percent and the critical amount of oil is in the range from 51 to 30 percent.

PREFERRED EMBODIMENT OF THE INVENTION

The instant water-soluble alkyd resin is prepared by reacting from 30 to 51 percent by weight of an olefinically unsaturated carboxylic fatty acid having at least 10 carbon atoms, such as the vegetable and fish oils. More preferred are the vegetable oils and particularly tall oil and safflower oil. In view of the fact that tall and safflower oils are two of the softest drying oils it is surprising and unexpected that they should be preferred ingredients for the formation of exceptionally hard alkyd resins.

Another ingredient is phenylindan dicarboxylic acid (PIDA) the chemical name of which is 1,1,3-trimethyl-5-carboxy-3(p-carboxyphenyl) indan which is used in an amount greater than 30 percent but less than 45 percent by weight of the reaction mixture. Surprisingly, in view of the angularity of the PIDA molecule which permits a high knuckle action, this rather large percentage of PIDA in the alkyd resin contributes to exceptional strength, toughness and fast drying rates of the film.

Another ingredient is a polyhydric alcohol. Amongst the polyhydric alcohols which may be used to form the instant alkyd resins are ethylene glycol, diethylene glycol, trimethylene glycol, tetramethylene glycol, glycerol, trimethylol propane; 2,2-dimethylpropanediol-1,3; trimethylol propane; 2,2-dimethylpropanediol-1,3; trimethylol ethane; 2-ethyl-2-butyl-propanediol-1,3; pentaerythritol, dipentaerythritol, sorbitol, pinacol, arabitol, xylitol, adonitol, mannitol and the alkane diols such as butanediol-1,3; butanediol-1,4; pentanediol-1,5; hexanediol-1,6- and the like. These polyhydric alcohols may be used either singly or in combination with one another.

The last ingredient is a benzene tribasic acid, such as trimesic acid, hemimellitic acid, trimellitic acid and anhydrides thereof where such anhydrides exist. Most preferred is trimellitic anhydride. Surprisingly this substitution of trimellitic anhydride with a different acid such as dimethylol propionic acid does not give the drying times nor the extreme mildew resistance that is obtained by benzene tribasic acids and particularly trimellitic anhydride.

The process for making the instant alkyd resin comprises heating the olefinically unsaturated carboxylic acid to about 400° F under an inert gas blanket, and adding thereto the PIDA and the polyhydric alcohol and maintaining heating until a desired acid number is reached. The reaction mass is cooled and the benzene tribasic acid or anhydride is added and the temperature maintained below 400° F. Upon reaching the desired acid number the reaction mass is thinned in a suitable solvent and cooled.

The following examples describe the preparation of the instant alkyd resin. All parts are parts by weight unless otherwise denoted.

EXAMPLE 1

36.84 parts tall oil are placed in a reactor under an inert gas blanket and heated to 400° F. 22.38 parts trimethylol propane and 41.6 parts PIDA are added to the reactor and homogeneously distributed to the tall oil while the reaction mass is heated to 480° F. The contents of the reactor are held for an acid number of 10–12, and then cooled to 380° F. 7.03 parts trimellitic anhydride are added to the reaction mass and the temperature maintained at 380° F until an acid number of from 48–52 is obtained. The reaction mass is then dropped into a thinning tank and thinned with a suitable solvent such as propoxy propanol to about 70 percent non-volatile material and filtered.

Solubilization with an alkaline material such as ammonia, an amine, or an alkali metal hydroxide permits dilution with water.

EXAMPLE 2

Films of the alkyd resin, the preparation of which is described in Example 1 hereinabove, dried tack-free in 30 minutes. and attain a hardness of "F" (scale) after 24 hours. Immersion of an air dried film overnight in water at room temperature does not cause any film degradation. Adhesion tests run with a knife blade indicates that the adhesion of the alkyd resin is excellent and comparable to the best available commercial alkyd resins particularly on surfaces which are not exceptionally clean.

In a test for mildew resistance the resin prepared as in Example 1 hereinabove was tested against the best commercially available soya oil alkyd resins by a 12 month exterior exposure test at a 45° angle, facing South, in Florida. Using a rating system of 1 to 10, 10 points indicating no observable mildew attack, the PIDA alkyd enamel was rated 8 points compared to the commercial enamels which were about 3 points.

We claim:

1. An alkyd resin prepared by reacting 30 to 51 percent by weight of an oil containing an olefinically unsaturated carboxylic fatty acid having at least 10 carbon atoms, with more than 30 percent but less than 45 percent of phenylindan dicarboxylic acid and a sufficient amount of a trihydroxy polyol to provide an OH:COOH ratio in the range from about 1.5 to about 2.5 and a sufficient quantity of a benzene tribasic acid or anhydride to react with from 70 to about 80 percent of the hydroxy groups present to form a water-dispersible alkyd resin capable of air drying to a hard, glossy, durable finish without baking.

2. The resin of claim 1 wherein said oil is tall oil or safflower oil, said trihydroxy polyol is trimethylol propane and said benzene tribasic anhydride is trimellitic anhydride.

3. An alkyd resin prepared by reacting 30 to 51 percent by weight of an oil containing an olefinically unsaturated carboxylic fatty acid having at least 10 carbon atoms, with more than 30 percent but less than 45 percent of phenylindan dicarboxylic acid and a sufficient amount of a trihydroxy polyol to provide an OH:COOH ratio in the range from about 1.5 to about 2.5 and from about 5 to about 15 percent by weight and trimellitic anhydride in the range from about 5 to about 15 percent by weight on a water-free basis.

4. The composition of claim 3 wherein said oil is tall oil or safflower oil and said trihydroxy polyol is trimethylol propane.

* * * * *